United States Patent

Harbeke et al.

[11] Patent Number: 5,220,774
[45] Date of Patent: Jun. 22, 1993

[54] CUTTING FILAMENT FOR A VEGETATION CUTTER

[75] Inventors: Jörg Harbeke, Bad Oldesloe; Klaus Schmitz, Reutlingen, both of Fed. Rep. of Germany

[73] Assignee: Andreas Stihl, Waiblingen, Fed. Rep. of Germany

[21] Appl. No.: 659,095

[22] Filed: Feb. 22, 1991

[30] Foreign Application Priority Data

Feb. 24, 1990 [DE] Fed. Rep. of Germany ....... 4005879

[51] Int. Cl.$^5$ .......................... A01D 55/00; D02G 3/00
[52] U.S. Cl. ....................................... 56/12.7; 56/295; 30/276; 30/347; 428/397; 428/398; 428/400; 428/401
[58] Field of Search .............. 428/397, 399, 400, 401; 30/276, 347; 56/12.7, 295

[56] References Cited

U.S. PATENT DOCUMENTS

| | | | |
|---|---|---|---|
| 2,536,312 | 1/1951 | Saether | 428/400 |
| 3,063,094 | 11/1962 | Warthen | 428/397 |
| 3,078,544 | 2/1963 | Shealy | 428/397 |
| 4,054,993 | 10/1977 | Kamp et al. | 30/276 |
| 4,186,239 | 1/1980 | Mize et al. | 428/399 |
| 4,869,055 | 9/1989 | Mickelson | 56/12.7 |
| 4,905,465 | 3/1990 | Jones et al. | 56/295 |

FOREIGN PATENT DOCUMENTS 0260158 3/1988 European Pat. Off. .

Primary Examiner—George F. Lesmes
Assistant Examiner—Christopher Brown
Attorney, Agent, or Firm—Walter Ottesen

[57] ABSTRACT

The invention is directed to a cutting filament for a vegetation cutter. The vegetation cutter includes a drive motor which sets the cutting filament in motion thereby producing noise. The cutting filament extends substantially radially outwardly because of the centrifugal force. The cutting filament reduces noise especially at high rotational speeds and thus also at high peripheral speeds. This is achieved in that the cutting filament is configured to have a cross section not having point symmetry. The cutting filament preferably has at least one slot and/or protrusion formed in the surface thereof to extend in the longitudinal direction. The slot and/or protrusion can, for example, be formed so as to follow a helical path with respect to the longitudinal axis of the filament or it can extend parallel to this axis.

26 Claims, 3 Drawing Sheets

CUTTING FILAMENT FOR A VEGETATION CUTTER

FIELD OF THE INVENTION

The invention relates to a cutting filament for vegetation cutters having a drive motor which imparts rotational movement to the cutting filament.

BACKGROUND OF THE INVENTION

U.S. Pat. No. 4,186,239 discloses a cutting filament made of nylon and having a substantially round or elliptical cross section. The filament has a plurality of notches extending transversely to the longitudinal axis and arranged on the surface. In addition, this patent describes cutting filaments which consist of two or more filament bodies, which are joined to each other along their longitudinal axis or are combined to form a star-shaped profile. These configurations of cutting filaments all have a cross section with point symmetry, either the point symmetry being provided at 90°, such as for example in the case of a cross-shaped cross section, or at 180° as in the case of an elliptical cross section. In the known star-shaped profiles, the base body has a small cross section which causes the strength of the cutting filament to be relatively low. The notches extending transversely with respect to the longitudinal axis are intended to prevent the nylon filament from fraying; that is, the notches define predetermined breaking edges at the free end of the cutting filament.

European patent publication 0,260,158 likewise discloses a cutting filament having a star-shaped cross section so that this cutting filament also has point symmetry.

The noise level of vegetation cutters is very high because apparatus of this type are operated at high rotational speeds of up to 10,000/min. This noise level is caused primarily by the shedding of vortices on the cutting filament rotating at high speed.

SUMMARY OF THE INVENTION

It is the object of the invention to provide a cutting filament for a vegetation cutter with which a substantial noise reduction is achieved even at a high rotational speed of the cutting filament.

This object is achieved with the cutting filament of the invention which has a cross section which changes in position along the length of the filament. The cutting filament of the invention has a point unsymmetrical cross section which preferably extends helically over the length of the cutting filament. In a preferred embodiment, the cross section of the cutting filament is realized in that the cutting filament has at least one slot and/or protrusion extending in the longitudinal direction and formed on the surface of the base body of the filament. The base body constitutes almost the entire cross section of the filament. The slot or protrusion may extend in a straight line. The slot and/or protrusion advantageously extends helically with the pitch, that is the wavelength of the helix, being between 5 mm and 50 mm. Preferably, the wavelength is between 10 mm and 20 mm.

A configuration of the cutting filament described above ensures that the shedding of the vortices at the cutting filament no longer takes place periodically and the formation of noise is countered because of an intentional earlier shedding of vortices which now always takes place at a different point. The tensile strength of the filament is unaffected because the protrusions or slots change the circular cross-sectional shape of the base member only slightly. Accordingly, the cutting filament provides a high resistance to wear. As cross sections not having point symmetry, parts of circular cross sections, such as three-quarter circular cross sections or half-round circular cross sectios or the like are suitable, that is, cross sections of cutting filaments which are flattened and preferably extend helically when viewed over the length of the filament; this prevents a symmetrical positioning of the cutting filament. The terms "cross section of the cutting filament not having point symmetry" or "point unsymmetrical cross section" are applicable to any cross section which, after a rotation through 360°, again assumes a position which is coincident with its initial position.

According to another embodiment of the invention, the slot or protrusion extends without interruption with a constant depth or height and width along its length or helical path. Cutting filaments of such a configuration can be produced economically. However, as an alternate embodiment, several slots or protrusions may also be provided and extend over a partial length of the cutting filament. In this embodiment, it is advantageous that at least at or near the end of a slot or protrusion, the next slot or protrusion has a first portion thereof located so as to overlap the end portion of the other slot or protrusion in that this first portion is offset at a specific peripheral angle from said end portion. Thus, the slots or protrusions extend along the length of the filament one behind the other with each two slots or protrusions being next to each other for respective predetermined lengths of the filament. The shedding of the vortices takes place in an intensified manner in these regions of overlap.

The base member has substantially a circular cross section and the elevation of the protrusion amounts at the maximum to 1/5th, preferably 1/7th to 1/10th, of the diameter of the base member. The relatively low elevation of the protrusion in no way influences the resistance to tearing and the cutting performance compared to known configurations. However, the configuration of the filament of the invention is sufficient to achieve the desired noise reduction. A semicircle, trapezoid or triangle are preferred configurations for the cross section of the protrusion.

For embodiments of the cutting filament with a slot, it has been shown to be advantageous to make the depth of the slot so that it is 1/3rd to 1/7th, preferably 1/5th, of the diameter of the cutting filament depending on the actual diameter of the base body. It is advantageous to make the cross section of the slot conical or trapezoidal in order to weaken the cutting filament as little as possible and to maintain a high resistance to tearing. On its outer side, the width of the slot is at least 0.5, but preferably greater than 0.8 mm. As an alternative to the conical or trapezoidal cross section, the slot may also have the shape of an annular segment or a circular segment, the curve of this cross-sectional surface having an angle of up to approximately 150°. However, such a configuration is considered only when only a single slot is provided in the surface of the base member.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
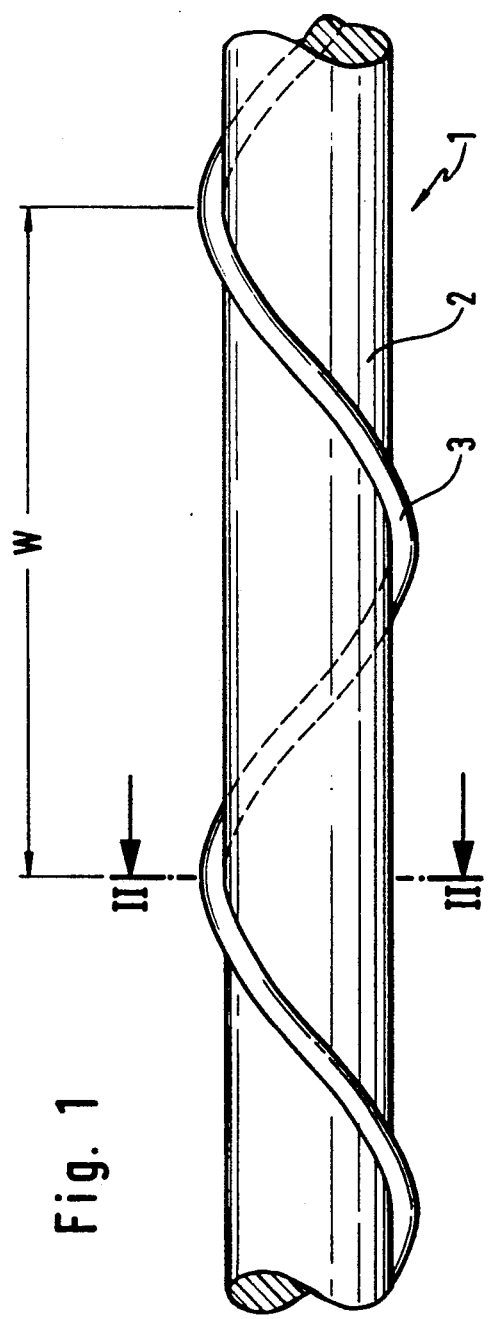
FIG. 1 is a side elevation view of a cutting filament having a point unsymmetrical cross section and a helical protrusion formed on its surface.

The cutting filament 1 shown in FIG. 1 includes a base member 2 and a protrusion 3 arranged in a helical configuration on the surface of the filament. The base member 2 and the protrusion 3 are extruded or injection-molded from a synthetic material such as nylon and conjointly define the cutting filament 1 as an integral part. The protrusion 3 can be coiled around the base member 2 with a varying pitch and the axial spacing for one turn being defined to as the wavelength W.

Figure 2:
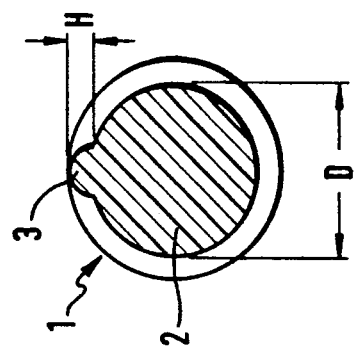
FIG. 2 is a section view taken along line II—II of FIG. 1.

FIG. 2 is a radial section of the filament of FIG. 1 and shows that the base member 2 and the protrusion 3 are produced as an integral part. The base member 2 generally has a diameter D of between 1 mm and 4 mm and this diameter D is between 1.2 mm and 2.4 mm for most configurations. The elevation H is the amount by which the protrusion projects above the surface of the base member 2. The elevation H is adjusted to the diameter D of the base member 2 and is at most 1/5th of the diameter D. In the embodiment of FIGS. 1 and 2, the elevation H is approximately 1/7th of the diameter D of the base member 2.

Figure 3:
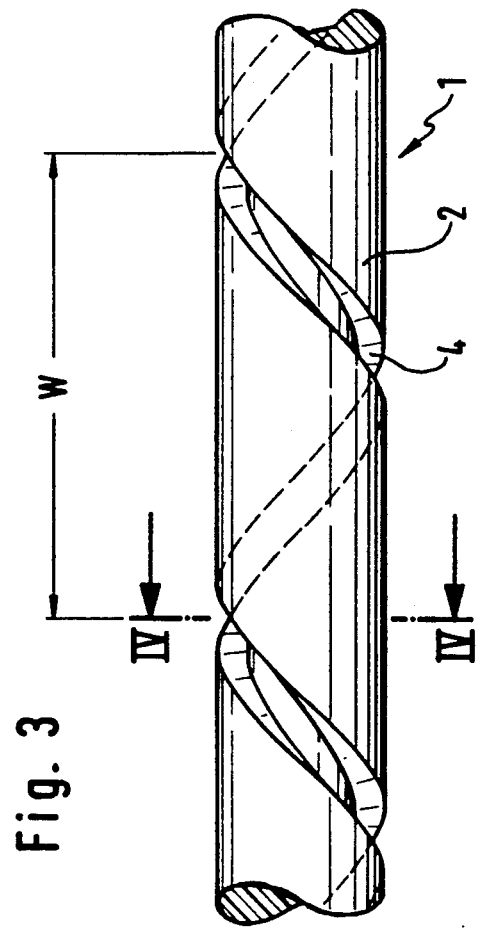
FIG. 3 is a side elevation view of a cutting filament having a point unsymmetrical cross section with a helically-shaped slot formed in the surface thereof.

FIG. 3 shows a cutting filament wherein the base member 2 is provided with a slot 4 extending in a helical manner along the surface of the base member 2. As in FIG. 1, the wavelength is identified by W. FIG. 4a is a section through the cutting filament 1 with the diameter of the base member 2 being designated by reference character D. At the upper edge of the base member 2 shown in FIG. 4a, the slot 4 is shown as having a substantially trapezoidal cross section with a depth T and a width B. In the embodiment of FIG. 4a, the cutting filament 1 can, for example, have a diameter D of 2.4 mm with the slot having a depth T of 0.5 mm and a width B of 0.8 mm.

Figure 4B:
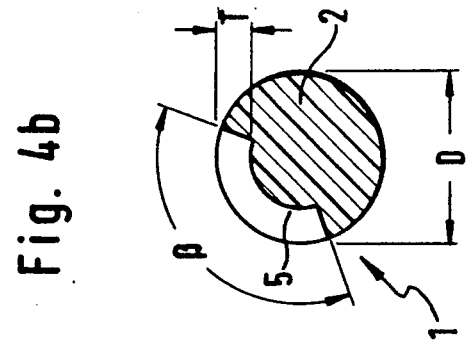
FIG. 4b is a section view of a cutting filament according to another embodiment of the invention wherein the slot is formed in the surface thereof so as to extend over an angle β when viewed in section.
Figure 4A:
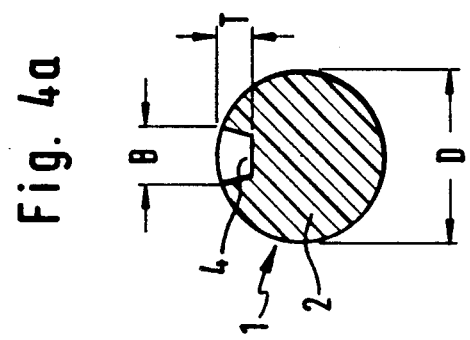
FIG. 4a is a section view taken along line IV—IV of FIG. 3.

FIG. 4b shows an alternate embodiment of the cutting filament 1 wherein a slot 5 is formed in the base member 2 having a cross section in the shape of an annular segment. The radial extent of the slot is designated as the depth T and the annular segment extends over an angle β of approximately 130° when viewed in section.

Figure 5:
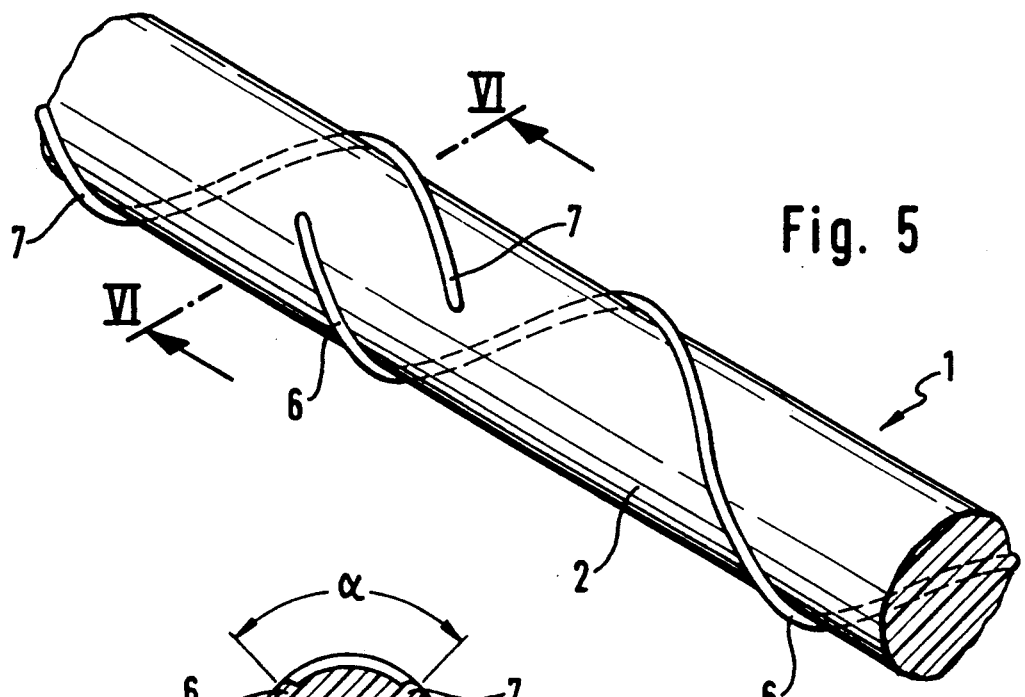
FIG. 5 is a perspective view of an embodiment of the invention which is a variation of the embodiment shown in FIG. 1 with the helically-shaped protrusion being formed as individual segments.
Figure 6:
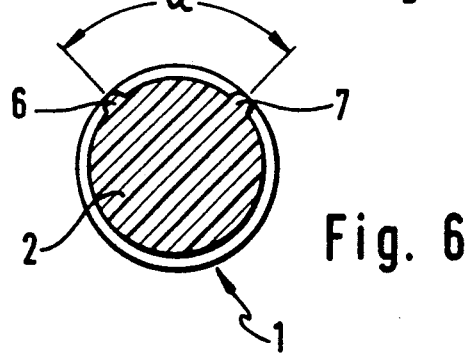
FIG. 6 is a section view taken along line VI—VI of FIG. 5.

FIG. 5 shows a cutting filament 1 having a plurality of protrusions 6 and 7 formed on the surface of the base member 2. Each of these protrusions 6 and 7 extends only over a partial length of the cutting filament 1. The protrusion segments are arranged one behind the other along the length of the filament with protrusion segment 7 already beginning before the end of the protrusion segment 6 and being offset with respect thereto at a predetermined peripheral angle α. This overlapping is shown in FIG. 6 which is a section view taken along lien VI—VI of FIG. 5.

Figure 7:
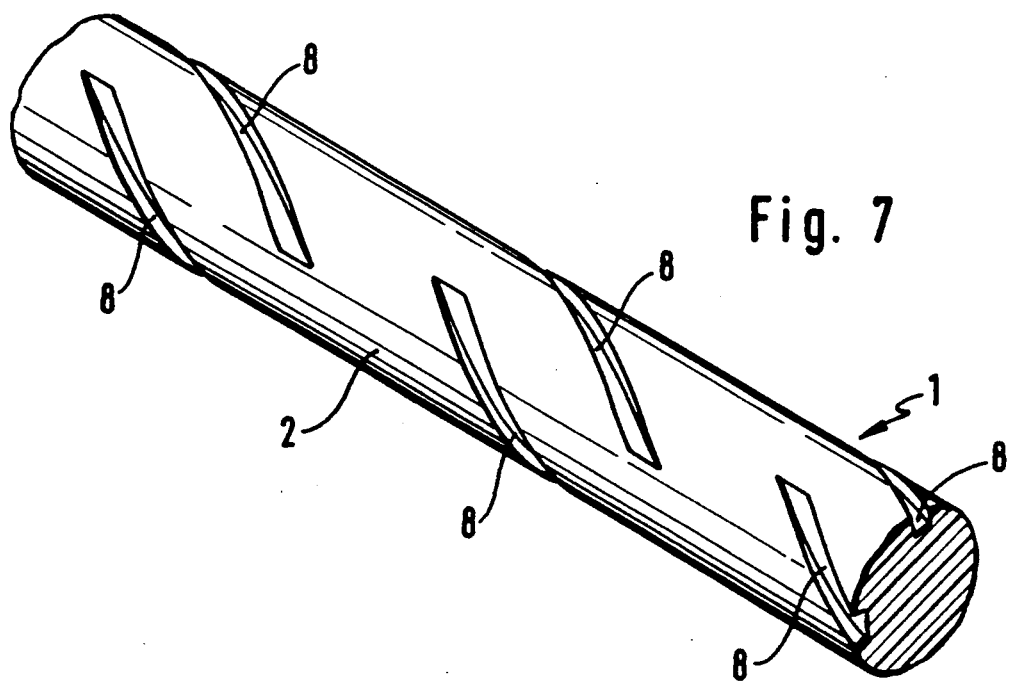
FIG. 7 is a perspective view of a variation of the embodiment shown in FIG. 3 wherein the filament is provided with a plurality of helical slot segments.

FIG. 7 is a perspective view of a cutting filament 1 wherein the base member 2 includes a plurality of slots 8 formed therein so as to extend in a helical manner in the surface. These slots 8 extend only over part of the axial length of the cutting filament 1. However, the arrangement is such that at lest one slot 8 is provided at any pivot along the axial length of the filament.

Figure 8:
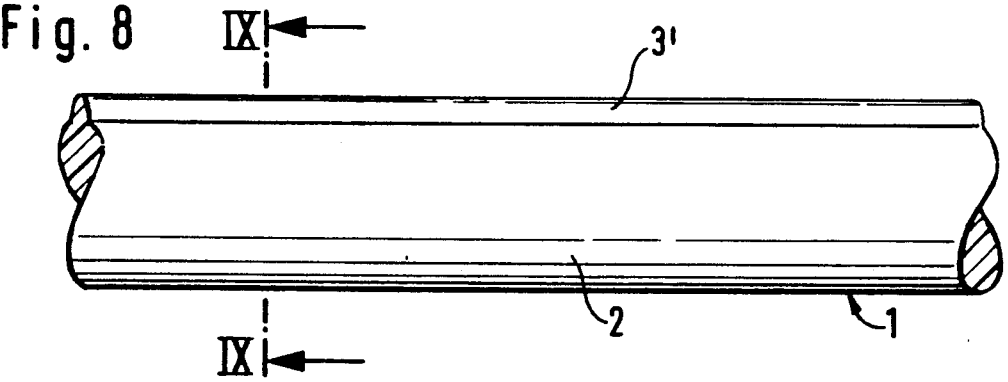
FIG. 8 is a side elevation view of a cutting filament having a point unsymmetrical cross section and wherein the protrusion is linear and extends in the direction of the longitudinal axis of the filament.
Figure 9:
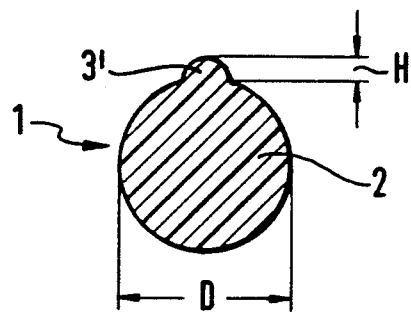
FIG. 9 is a section view taken along line IX—IX of FIG. 8.

The cutting filament 1 of FIG. 8 includes the base member 2 having a protrusion 3' formed on the surface thereof. As shown in FIG. 9, the protrusion 3' is configured in one piece with the base member 2 and extends linearly in the longitudinal direction of the cutting filament. The dimensions of the protrusion 3' correspond to those of FIGS. 1 and 5.

Figure 10:
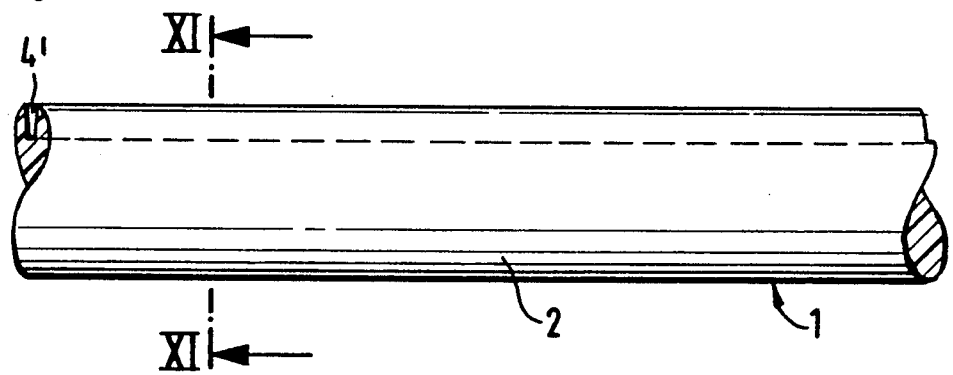
FIG. 10 is a side elevation view of a cutting filament according to another embodiment of the invention wherein the slot is linear and extends in the direction of the longitudinal axis of the filament.
Figure 11:
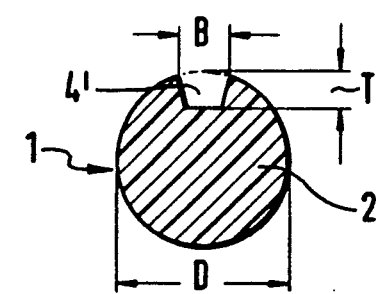
FIG. 11 is a section view taken along line XI—XI of FIG. 10.

In the embodiment of FIGS. 10 and 11, the point unsymmetrical filament 1 has a slot 4', which extends linearly in the longitudinal direction of the filament 1 instead of the protrusion 3'. The dimensions of the slot 4' correspond to the dimension of the slots of FIGS. 3, 4a, 4b and 7.

Figure 12:
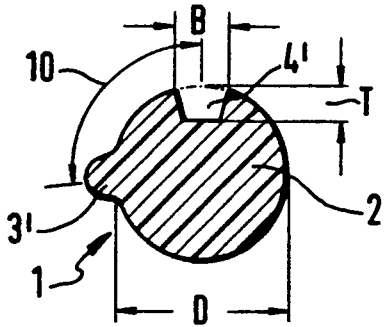
FIG. 12 is a section view of a cutting filament according to still another embodiment of the invention which likewise has a point unsymmetrical cross section and includes a linearly extending slot and a linearly extending protrusion.

In the radial section according to the embodiment of FIG. 12, a protrusion 3' and a slot 4' are combined on a base member 2 of the cutting filament 1. In this embodiment, the protrusion 3' and the slot 4' are offset in the peripheral direction at an angle 10 with respect to each other. The angle 10 in this embodiment is approximately 90° and is preferably greater than 30°.

The desired attenuation of noise in cutting filaments for vegetation cutters which are operated at high rotational speeds of up to 10,000 rpm is achieved with the filament according to the invention because of the point unsymmetrical cross-sectional shape of the cutting filament. The cutting filament is furthermore configured so that it has a varying cross-sectional shape with respect to its longitudinal axis. The cross-sectional shape preferably varies in a helical manner. Since the term "point unsymmetrical cross section" means any cross section which, after a rotation of 360°, assumes a position coincident with its initial position various configurations of the cross section of such a cutting filament according to the invention are conceivable.

Apart from the embodiments described above, point unsymmetrical cross sections are conceivable, which start from a circular shape and have a flat formed thereon. The size of the flat can be determined empirically according to the relationships, so that a ¾ circular cross section or a semi-circular cross section of the cutting filament remains after the flat is formed. Such a point unsymmetrical configuration can be produced from synthetic material in the same manner as known cutting filaments, namely, either by injection-molding or drawing according to any suitable method.

The embodiments described above show that at at least one point of its axial length, the cutting filament comprises a protrusion or a slot so that the means for aperiodically shedding vortices are provided along the entire cutting filament. In addition to the embodiments shown in the drawing and described above, other combinations of slots and protrusions may also be considered.

It is understood that the foregoing description is that of the preferred embodiments of the invention and that various changes and modifications may be made thereto without departing from the spirit and scope of the invention as defined in the appended claims.

What is claimed si:

1. In a vegetation cutter which includes a cutting filament held at one end thereof and having a free end, a structure for holding the cutting filament at said one end thereof, and a drive motor for imparting a rotational movement to said structure and said cutting filament so as to cause said free end thereof to extend substantially in a radial outward direction because of the centrifugal force developed during rotation of the cutting filament, the cutting filament improvement wherein the comprises;

an elongated filament body having a longitudinal axis defining a longitudinal direction and having a rounded outer surface extending over substantially all of said body when viewed in cross section; and, interruption means for interrupting said rounded outer surface so as to extned along said surface in the longitudinal direction of the cutting filament causing said cutting filament to aperiodically shed vortices in air as the cutting filament rotates thereby reducing the level of noise produced by the cutting filament during operation.

2. The cutting filament of claim 1, said filament body being made of nylon.

3. In a vegetation cutter which includes a cutting filament held at one end thereof and having a free end, a structure for holding the cutting filament at said one end thereof, and a drive motor for imparting a rotational movement to said structure and said cutting filament so as to cause said free end thereof to extend substantially in a radial outward direction because of the centrifugal force developed during rotation of the cutting filament, improvement wherein the cutting filament comprises, an elongated filament body having a longitudinal axis defining a longitudinal direction and having a rounded outer surface extending over substantially all of said body when viewed in cross section;

interruption means for interrupting said rounded outer surface so as to extned along said surface in the longitudinal direction of the cutting filament causing said cutting filament to aperiodically shed vortices in air as the cutting filament rotates thereby reducing the level of noise produced by the cutting filament during operation;

said filament body having a cross section defining a peripheral outline when an imaginary cutting plane is passed through said body perpendicular to said axis; and, said interruption means being formed on said body so as to cause said cross section to conform to and precisely overlap its initial position only when said cross section is rotated through 360° about said axis.

4. The cutting filament of claim 3, said interruption means being a slot.

5. The cutting filament of claim 4, said filament body having a diameter D and said slot having a depth T in the range of D/3 to D/7.

6. The cutting filament of claim 5, said depth T being D/5.

7. The cutting filament of claim 6, said interruption means extending along said surface so as to define a helical path about said longitudinal axis.

8. The cutting filament of claim 6, said helical path having a pitch between 5 mm and 50 mm.

9. The cutting filament of claim 8, said pitch being in the range of 10 mm to 20 mm.

10. The cutting filament of claim 4, said slot having conical shape when viewed in section.

11. The cutting filament of claim 10, said slot having a width B of at least 0.5 mm at the elevation of said surface.

12. The cutting filament of claim 10, said width B being 0.8 mm.

13. The cutting filament of claim 4, said slot having a trapezoidal shape when viewed in section.

14. The cutting filament of claim 13, said slot having a width B of at least 0.5 mm at the elevation of said surface.

15. The cutting filament of claim 14, said width B being 0.8 mm.

16. The cutting filament of claim 4, said slot having a shape corresponding to an annular segment when viewed in section and said slot having an angle extending over an angle of up to approximately 150° also when viewed in section.

17. The cutting filament of claim 3, said interruption means being a protrusion formed on said rounded surface.

18. The cutting filament of claim 17, said base body defining a circular cross section having a diameter D and said protrusion extending upwardly from said surface; and, said protrusion having an elevation H which is equal to at most D/5.

19. The cutting filament of claim 18, said protrusion having an elevation H in the range of D/7 to D/10.

20. The cutting filament of claim 18, said protrusion having a semi-circular cross section.

21. The cutting filament of claim 18, said protrusion having a trapezoidal cross section.

22. The cutting filament of claim 18, said protrusion having a triangular cross section.

23. The cutting filament of claim 3, said body having a circular cross section.

24. The cutting filament of claim 3, said interruption means being formed on said rounded surface so as to cause said cross section to have a different angular position for each increment of distance measured along said axis.

25. In a vegetation cutter which includes a cutting filament held at one end thereof and having a free end, a structure for holding the cutting filament at said one end thereof, and a drive motor for imparting a rotation movement to said structure and said cutting filament so as to cause said free end thereof to extend substantially in a radial outward direction because of the centrifugal force developed during rotation of the cutting filament, the cutting filament improvement wherein the comprises:

an elongated filament body having a longitudinal axis defining a longitudinal direction and having an outer surface;

said filament body having a cross section defining a peripheral outline when an imaginary cutting plane is passed through said body perpendicular to said longitudinal axis;

said cross section containing imaginary horizontal and vertical axes conjointly defining an origin on said longitudinal axis; and, interruption means formed on said surface so as to cause said outline to be asymmetrical to each one of said axes when said cross section is taken along incremental lengths of said axis causing said cutting filament to aperiodically shed vortices in air as the cutting filament rotates thereby reducing the level of noise produced by the cutting filament during operation.

26. The cutting filament of claim 25, said filament body being made of Nylon.

* * * * *

UNITED STATES PATENT AND TRADEMARK OFFICE
CERTIFICATE OF CORRECTION

PATENT NO. : 5,220,774

DATED : June 22, 1993

INVENTOR(S) : Jörg Harbeke and Klaus Schmitz

It is certified that error appears in the above-identified patent and that said Letters Patent is hereby corrected as shown below:

In column 2, line 7: delete "sectios" and substitute -- sections -- therefor.

In column 4, line 27: delete "lien" and substitute -- line -- therefor.

In column 4, line 33: delete "lest" and substitute -- least -- therefor.

In column 4, line 34: delete "pivot" and substitute -- point -- therefor.

In column 4, line 46: delete "dimension" and substitute -- dimensions -- therefor.

In column 4, line 66: between "position" and "various", insert -- , --.

In column 5, line 25: delete "si:" and substitute -- is: -- therefor.

In column 5, line 35: delete "cutting filament".

In column 5, line 36: between "the" and "comprises", insert -- cutting filament --.

UNITED STATES PATENT AND TRADEMARK OFFICE
CERTIFICATE OF CORRECTION

PATENT NO. : 5,220,774
DATED : June 22, 1993
INVENTOR(S) : Jörg Harbeke and Klaus Schmitz It is certified that error appears in the above-identified patent and that said Letters Patent is hereby corrected as shown below:

In column 5, line 36: delete "comprises;" and substitute -- comprises: -- therefor.

In column 5, line 42: delete "extned" and substitute -- extend -- therefor.

In column 5, line 58: between "filament," and "improvement", insert -- the --.

In column 5, line 59: delete "comprises," and substitute -- comprises: -- therefor.

In column 5, line 65: delete "extned" and substitute -- extend -- therefor.

In column 7, line 10: delete "cutting filament improvement wherein" and substitute -- improvement wherein the cutting filament --.

Signed and Sealed this

Twenty-second Day of March, 1994

Attest:

BRUCE LEHMAN

*Attesting Officer*       *Commissioner of Patents and Trademarks*